United States Patent
Du et al.

(10) Patent No.: US 10,830,037 B2
(45) Date of Patent: Nov. 10, 2020

(54) CONSTANT AMPLITUDE ADJUSTING METHOD AND SYSTEM FOR PRESSURE PULSE OF DRILLING TOOL

(71) Applicant: Institute of Geology and Geophysics, Chinese Academy of Sciences, Beijing (CN)

(72) Inventors: Jiansheng Du, Beijing (CN); Qingyun Di, Beijing (CN); Zili Wang, Beijing (CN); Wenxuan Chen, Beijing (CN); Xinzhen He, Beijing (CN); Yongyou Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/715,856

(22) Filed: Dec. 16, 2019

(65) Prior Publication Data
US 2020/0208511 A1 Jul. 2, 2020

(30) Foreign Application Priority Data
Dec. 29, 2018 (CN) .......................... 2018 1 1639916

(51) Int. Cl.
*E21B 47/18* (2012.01)
*G01V 1/52* (2006.01)
(Continued)

(52) U.S. Cl.
CPC .............. *E21B 47/18* (2013.01); *E21B 34/08* (2013.01); *G01V 1/52* (2013.01); *E21B 47/24* (2020.05)

(58) Field of Classification Search
CPC .......... E21B 47/12; E21B 47/14; E21B 47/18; E21B 47/20; E21B 47/22; E21B 47/24; E21B 34/08; G01V 1/52
See application file for complete search history.

(56) References Cited

U.S. PATENT DOCUMENTS

| 6,714,138 B1 * | 3/2004 | Turner ................... E21B 47/18 340/854.3 |
| 8,319,657 B2 * | 11/2012 | Godager .............. G01V 11/002 340/854.6 |
| 2015/0009039 A1 * | 1/2015 | Tinnen ................... E21B 47/18 340/850 |

FOREIGN PATENT DOCUMENTS

| CN | 102777172 A | 11/2012 |
| CN | 103670380 A | 3/2014 |

(Continued)

OTHER PUBLICATIONS

Chinese Application No. 201811639916.6, Chinese Office Action dated Jan. 6, 2020, 10 pages.

(Continued)

*Primary Examiner* — Franklin D Balseca
(74) *Attorney, Agent, or Firm* — Zhong Law, LLC (57) ABSTRACT

A constant amplitude adjusting method and system for pressure pulse of drilling tool including obtaining a current flow velocity value of mud at the rear of a pressure pulse generator in the drilling tool, and sending the current flow velocity value to a controller; the controller compares the current flow velocity value with a preset flow velocity value, and sends an adjustment instruction to the pressure pulse generator according to the comparison result; the pressure pulse generator adjusts the opening degree according to the adjustment instruction of the controller. The adjusting system comprising a pressure pulse generator for generating a pressure pulse wave, and the opening degree is adjustable.

17 Claims, 4 Drawing Sheets

(51) Int. Cl.
　　　 *E21B 34/08*　　　(2006.01)
　　　 *E21B 47/24*　　　(2012.01)

(56)　　　　　References Cited

FOREIGN PATENT DOCUMENTS

CN　　　　105484742 A　　　4/2016
CN　　　　207296996 U　　　5/2018

OTHER PUBLICATIONS

Chinese Application No. 201811639916.6, Chinese Office Action dated Jul. 14, 2020, 15 pages.

* cited by examiner

CONSTANT AMPLITUDE ADJUSTING METHOD AND SYSTEM FOR PRESSURE PULSE OF DRILLING TOOL

CROSS-REFERENCE TO RELATED APPLICATION

This application claims priority to Chinese Patent Application No. 201811639916.6 filed Dec. 29, 2018, the content of which is incorporated herein by reference in its entirety.

TECHNICAL FIELD

The disclosure relates to constant amplitude adjusting method and system for pressure pulse of drilling tool, and pertains to the technical field of drilling.

BACKGROUND

The measurement-while-drilling (MWD) technology enables real-time transmission of measurement-while-drilling geological logging parameters, well trajectory parameters, drilling parameters and other data to a ground monitoring system during drilling. Drilling engineers and geological analysis engineers make timely decisions and adjust the well trajectory in real time according to the current real-time well trajectory parameters and the geological parameters of the strata near a drill bit, so that the drill bit is always drill in the oil and gas formation to maximize the drilling rate and recovery ratio of the hydrocarbon reservoir.

In the current technologies, a pressure pulse generator is arranged in a drill collar. When the mud flows through the pressure pulse generator, the pressure pulse generator generates pressure pulse waves, and the ground device decodes the pressure pulse waves after receiving them. Thereby, the well trajectory of the underground oil well and the reservoir geological information are obtained.

At present, during the drilling process, the mud flow needs to be adjusted due to the drilling technology, which causes the amplitude of the pressure pulse wave to change. Since the drilling depth is usually very deep, when the amplitude of the pressure pulse wave decreases, it is difficult to decode when being transmitted to the ground, thus affecting the speed and accuracy of decoding. The opening degree of a conventional pressure pulse generator needs to be pre-adjusted before drilling, and it cannot be automatically adjusted during the drilling process, and thus downstream communication is required, which occupies a certain drilling time. Therefore, there is an immediate need to develop a constant amplitude automatic maintenance technology for mud pulse pressure waves that can adapt to changes in well flow.

SUMMARY OF DISCLOSURE

An aspect of the present disclosure is to provide a constant amplitude adjusting method for pressure pulse of drilling tool, which can adjust the opening degree of a pressure pulse generator according to the change of the mud flow velocity, thereby generating a constant amplitude pressure pulse wave to solve the problem in the current technologies.

Another aspect of the present disclosure is to provide a constant amplitude adjusting system for pressure pulse of drilling tool, which is capable of realizing the above adjusting method, so that the opening degree of the pressure pulse generator can be adjusted according to requirements, to ensure constant amplitude pressure pulse wave.

The disclosure provides a constant amplitude adjusting method for pressure pulse of drilling tool, comprising the following steps:

step a, obtaining a current flow velocity value of mud at the rear of a pressure pulse generator in the drilling tool, and sending the current flow velocity value to a controller;

step b, the controller compares the current flow velocity value with a preset flow velocity value, and sends an adjustment instruction to the pressure pulse generator according to a comparison result;

step c, the pressure pulse generator adjusts an opening degree according to the adjustment instruction of the controller.

In the aforementioned constant amplitude adjusting method for pressure pulse of drilling tool, preferably, in the step b:

when the current flow velocity value is equal to the preset flow velocity value, step a and step b are repeatedly performed;

when the current flow velocity value is less than the preset flow velocity value, the controller sends an instruction of increasing the opening degree to the pressure pulse generator; and when the current flow velocity value is greater than the preset flow velocity value, the controller sends an instruction of decreasing the opening degree to the pressure pulse generator.

In the aforementioned constant amplitude adjusting method for pressure pulse of drilling tool, preferably, the method further comprises step d, after completing the step c, obtaining a current pressure value of the mud at the rear of the pressure pulse generator in the drilling tool, and sending the current pressure value to the controller, the controller compares the current pressure value with a preset pressure value, and sends an adjustment instruction to the pressure pulse generator according to a comparison result, the pressure pulse generator adjusts the opening degree according to the adjustment instruction of the controller again.

In the aforementioned constant amplitude adjusting method for pressure pulse of drilling tool, preferably, in the step d, when the current pressure value is greater than the preset pressure value, the controller controls the pressure pulse generator to decrease the opening degree;

when the current pressure value is less than the preset pressure value, the controller controls the pressure pulse generator to increase the opening degree; and when the current pressure value is equal to the preset pressure value, step a is performed.

A constant amplitude adjusting system for pressure pulse of drilling tool, comprising:

a pressure pulse generator that is arranged in a drill collar for generating a pressure pulse wave, where an opening degree of the pressure pulse generator is adjustable;

a flow measuring apparatus that is arranged at the rear of the pressure pulse generator for measuring a current flow velocity value of mud at the rear of the pressure pulse generator; and a controller that is configured to receive the current flow velocity value measured by the flow measuring apparatus, and compare the current flow velocity value with a preset flow velocity value, and send an opening degree adjustment instruction to the pressure pulse generator according to a comparison result.

In the aforementioned constant amplitude adjusting system for pressure pulse of drilling tool, preferably, the flow measuring apparatus comprises an impeller and a first angle sensor, and the first angle sensor is installed in the impeller.

In the aforementioned constant amplitude adjusting system for pressure pulse of drilling tool, preferably, a generator assembly is further included, the generator assembly is electrically connected to the controller, and a rotor of the generator assembly is fixedly connected to the impeller.

In the aforementioned constant amplitude adjusting system for pressure pulse of drilling tool, preferably, the pressure pulse generator comprises a motor, a valve seat, a valve core, a screw rod and a mounting sleeve, wherein the drill collar has a motor mounting cavity, and the motor is mounted in the motor mounting cavity, the screw rod is fixedly mounted on a rotating shaft of the motor, the mounting sleeve is screwed with the screw rod, and the valve core is fixedly connected with the mounting sleeve, the valve seat is fixed in the drill collar, the drill collar is provided with a mounting seat, and the mounting sleeve is movably connected to the mounting seat, and the mounting seat is used to limit the degree of freedom in a circumferential direction of the mounting sleeve.

In the aforementioned constant amplitude adjusting system for pressure pulse of drilling tool, preferably, the pressure pulse generator comprises a motor, a valve seat and an adjusting plate, wherein the drill collar has a motor mounting cavity, and the motor is mounted in the motor mounting cavity, the valve seat is fixed in the drill collar, and the adjusting plate is fixedly mounted on a rotating shaft of the motor, and the valve seat and the adjusting plate are respectively provided with through holes.

In the aforementioned constant amplitude adjusting system for pressure pulse of drilling tool, preferably, a second angle sensor is mounted at a rear end of the rotating shaft.

In the aforementioned constant amplitude adjusting system for pressure pulse of drilling tool, preferably, a pressure measuring mechanism is further included and is provided on an outer sidewall of the drill collar, the pressure measuring mechanism comprises a sensor assembly and a sealing member, a mounting groove is formed in the outer sidewall of the drill collar, the sealing member is fastened to the mounting groove and fixed by bolts, and the sensor assembly is fixedly mounted in the mounting groove, a liquid inlet hole communicating with a central flow channel of the drill collar is provided in the mounting groove, and a liquid inlet end of the sensor assembly is communicatively connected with the liquid inlet hole.

In the aforementioned constant amplitude adjusting system for pressure pulse of drilling tool, preferably, the mounting groove comprises a first groove body and a second groove body, and the second groove body is arranged on the bottom of the first groove body, the sealing member comprises a cover portion and a limiting portion which are of an integrated structure, the shape and size of the cover portion are correspondingly identical to the shape and size of the first groove body, and the shape and size of the limiting portion are correspondingly identical to the shape and size of the second groove body, a stepped hole is formed in each of the two ends of the cover portion, and threaded holes corresponding to the stepped holes are formed in the first groove body.

In the aforementioned constant amplitude adjusting system for pressure pulse of drilling tool, preferably, a lower holding groove is arranged on the bottom of the second groove body, an upper holding groove is arranged on the bottom of the limiting portion, the upper holding groove and the lower holding groove are oppositely disposed, the sensor assembly is mounted in a space formed by the upper holding groove and the lower holding groove, and one end of the liquid inlet hole is located in the lower holding groove, and the other end of the liquid inlet hole is communicatively connected with the center flow channel.

In the aforementioned constant amplitude adjusting system for pressure pulse of drilling tool, preferably, a wire harness hole is further included, one end of the wire harness hole is located in the lower holding groove, and the other end of the wire harness hole is communicatively connected with a wire routing hole of the drill collar.

In the aforementioned constant amplitude adjusting system for pressure pulse of drilling tool, preferably, the sensor assembly comprises a sheath, a connector and a sensor, wherein a first mounting hole is radially formed in a sidewall of one end of the sheath, a second mounting hole is axially formed in the other end of the sheath, the first mounting hole and the second mounting hole are communicatively connected through a flow channel, one end of the connector is fixedly mounted in the first mounting hole, and the sensor is fixedly mounted in the second mounting hole.

Compared with the current technologies, the present disclosure provides a constant amplitude adjusting method for pressure pulse of drilling tool, which determines how to adjust the opening degree of the pressure pulse generator by measuring the flow velocity of the mud in the drilling tool in real-time, and enables the constant amplitude pressure pulse wave by the opening degree adjustment of the pressure pulse generator, thereby solving the problem of increasing decoding difficulty caused by the instability of the amplitude of the pressure pulse wave in the prior art.

The disclosure also provides a constant amplitude adjusting system for pressure pulse of drilling tool, comprising: a pressure pulse generator, a flow measuring apparatus and a controller, wherein the controller receives a current flow velocity value of mud measured by the flow measuring apparatus and compares the current flow velocity value with a preset flow velocity value, and sends an opening degree adjustment instruction to the pressure pulse generator, thereby realizing the opening degree adjustment of the pressure pulse generator, so that the amplitude of the pressure pulse wave generated by the pressure pulse generator is constant.

The reference signs represent the following components: 1—pressure pulse generator, 2—drill collar, 3—flow measuring apparatus, 4—controller, 5—impeller, 6—first angle sensor, 7—generator assembly, 8—rotor, 9—motor, 10—valve seat, 11—valve core, 12—screw rod, 13—mounting sleeve, 14—motor mounting cavity, 15—rotating shaft, 16—mounting seat, 17—adjusting plate, 18—through hole, 19—second angle sensor, 20—pressure measuring mechanism, 21—sensor assembly, 22—sealing member, 23—mounting groove, 24—liquid inlet hole, 25—first groove body, 26—second groove body, 27—cover portion, 28—limiting portion, 29—stepped hole, 30—threaded hole, 31—center flow channel, 32—lower holding groove, 33—upper holding groove, 34—wire routing hole, 35—sheath, 36—connector, 37—sensor, 38—first mounting hole, 39—second mounting hole, 40—flow channel, 41—wire harness hole, 42—coupling, 43—guide groove, 44—guide rail, 45—sealing ring, 46—disassembling hole, 47—second locating hole, 48—first locating hole, 49—circular groove, 50—limiting circlip, 51—through hole, 52—limiting pin.

DESCRIPTION OF EMBODIMENTS

The embodiments described with reference to the drawings below are only exemplary, and are only intended to explain rather than to limit the present disclosure.

Embodiments of the disclosure: a constant amplitude adjusting method for pressure pulse of drilling tool, comprising the following steps:

step a, obtaining a current flow velocity value of mud at the rear of a pressure pulse generator in a drilling tool, and sending the current flow velocity value to a controller;

step b, the controller compares the current flow velocity value with a preset flow velocity value, and sends an adjustment instruction to the pressure pulse generator according to a comparison result. The specific method for comparison between the current flow velocity value and the preset flow velocity value is:

when the current flow velocity value is equal to the preset flow velocity value, step a and step b are repeatedly performed;

when the current flow velocity value is less than the preset flow velocity value, the controller sends an instruction of increasing the opening degree to the pressure pulse generator;

when the current flow velocity value is greater than the preset flow velocity value, the controller sends an instruction of decreasing the opening degree to the pressure pulse generator; and step c, the pressure pulse generator adjusts the opening degree according to the adjustment instruction of the controller.

Generally speaking, the constant amplitude pressure pulse wave can be realized after step c is completed. To improve the working accuracy of the present disclosure, in a preferred embodiment, a fine adjustment method is further added, specifically comprising step d: after completing the step c, obtaining the current pressure value of the mud at the rear of the pressure pulse generator in the drilling tool, and sending the current pressure value to the controller, the controller compares the current pressure value with a preset pressure value, and sends an adjustment instruction to the pressure pulse generator according to the comparison result, and the pressure pulse generator adjusts the opening degree according to the adjustment instruction of the controller again;

when the current pressure value is greater than the preset pressure value, the controller controls the pressure pulse generator to decrease the opening degree;

when the current pressure value is less than the preset pressure value, the controller controls the pressure pulse generator to increase the opening degree; and when the current pressure value is equal to the preset pressure value, step a is performed to proceed to the next adjustment cycle.

Hereinafter, the present disclosure provides a specific adjusting system that implements the above adjusting method.

Figure 1:
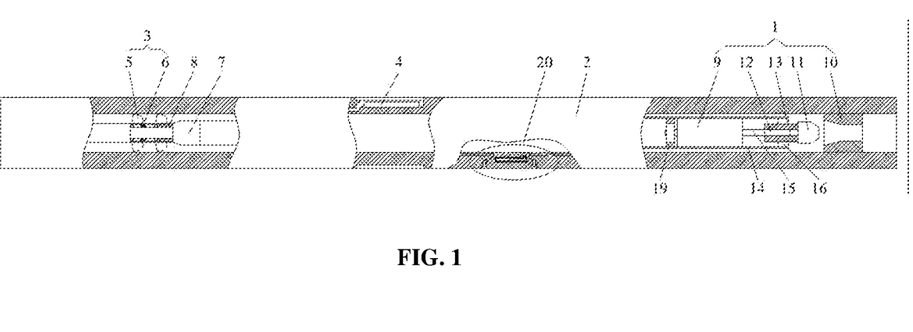
FIG. 1 is a schematic view of an overall structure according to an embodiment of the present disclosure.

As shown in FIG. 1, a constant amplitude adjusting system for pressure pulse of drilling tool, comprising:

a pressure pulse generator 1 that is arranged in a drill collar 2 for generating a pressure pulse wave, where the opening degree of the pressure pulse generator is adjustable;

a flow measuring apparatus 3 that is located at the rear of the pressure pulse generator 1 and is also arranged in the drill collar 2; the front and rear described in this embodiment are defined with respect to the drill collar 2, where the end with a drill bit of the drill collar 2 is the front, and the other end is the rear; the flow measuring apparatus 3 is used to measure a current flow velocity value of the mud at the rear of the pressure pulse generator 1; and a controller 4 that is arranged on an outer sidewall of the drill collar 2 for receiving the current flow velocity value measured by the flow measuring apparatus 3, and comparing the current flow velocity value with a preset flow velocity value, and sending an opening degree adjustment instruction to the pressure pulse generator 1.

When the mud inside the drill collar 2 flows through the flow measuring apparatus 3, the flow measuring apparatus 3 measures the current flow velocity value of the mud and sends the current flow velocity value to the controller 4, and the controller 4 compares the obtained current flow velocity value with the preset flow velocity value. When the current flow velocity value is equal to the preset flow velocity value, the pressure pulse generator 1 does not need to be adjusted; when the current flow rate value is less than the preset flow rate value, the controller sends an instruction of increasing the opening degree to the pressure pulse generator 1 to cause the pressure pulse generator 1 to increase the opening degree; and when the current flow velocity value is greater than the preset flow velocity value, the controller sends an instruction of decreasing the opening degree to the pressure pulse generator 1 to cause the pressure pulse generator 1 to decrease the opening degree. The mud flow velocity in the drill collar 2 is equal to the preset value by adjusting the opening degree of the pressure pulse generator 1, and when the mud flow velocity in the drill collar 2 is equal, the flow velocity of the mud which flows through the pressure pulse generator 1 is stable, and the pressure pulse wave generated by the pressure pulse generator 1 is of constant amplitude.

Specifically, the flow measuring apparatus 3 comprises an impeller 5 and a first angle sensor 6, and the first angle sensor 6 is installed in the impeller 5. When the mud flows through the impeller 5, the mud drives the impeller 5 to rotate, and the impeller 5 in turn drives the first angle sensor 6 to rotate. The first angle sensor 6 measures the rotational speed of the impeller 5, and the controller 4 converts the rotational speed information into the current mud flow velocity.

Since both the controller 4 and the pressure pulse generator 1 of the present disclosure require electricity, if the battery is separately provided, there is a problem that the battery needs to be replaced, and if the power is supplied from a power supply lead, special treatment is required for the structure of the drill collar 2, which will increase the difficulty of manufacture. Therefore, to solve the problem of power supply, an embodiment also provides a generator assembly 7, which is arranged inside the drill collar 2. The generator assembly 7 is electrically connected to the controller 4, and the controller 4 is electrically connected to the pressure pulse sensor 1. A rotor 8 of the generator assembly 7 is fixedly connected to the impeller 5. While the impeller 5 is rotating, the rotor 8 of the generator assembly 7 is driven to rotate, thereby causing the generator assembly 7 to generate electricity. This effectively reduces the manufacturing difficulty of the drill collar 2 and also solves the problem of power supply.

Figure 3:
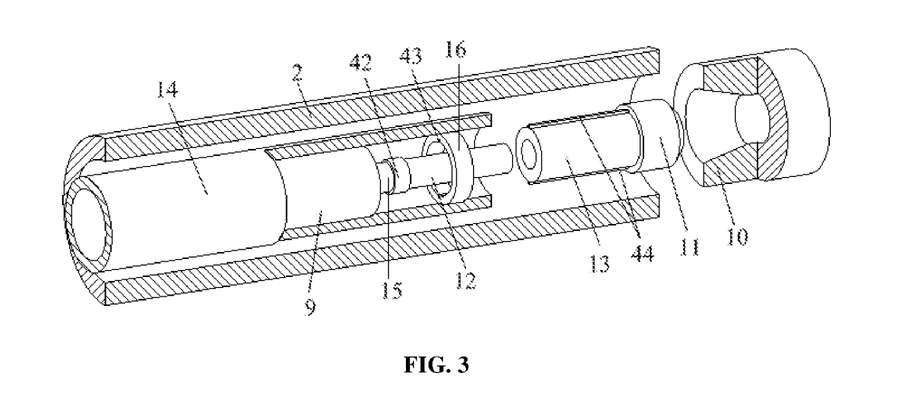
FIG. 3 is a schematic structural view of a pressure pulse generator.

The pressure pulse generator 1 is a central component of the present disclosure, which can take a variety of structural forms, and the present disclosure introduces two preferred solutions:

solution 1: As shown in FIG. 1 and FIG. 3, the pressure pulse generator 1 comprises a motor 9, a valve seat 10, a valve core 11, a screw rod 12 and a mounting sleeve 13, wherein the drill collar 2 has a motor mounting cavity 14 with cylindrical structure, the motor mounting cavity 14 is arranged along an axial direction of the drill collar 2, a flow channel is formed between the outer wall of the motor mounting cavity 14 and the inner wall of the drill collar 2, and the mud flowing through the pressure pulse generator 1 flows through the flow channel to the rear of the drill collar 2. The motor 9 is mounted in the motor mounting cavity 14, the motor 9 is electrically connected to the controller 4, and the screw rod 12 is fixedly mounted on a rotating shaft 15 of the motor 9 by a coupling 42. The central position of the mounting sleeve 13 has an internally threaded hole, the mounting sleeve 13 is screwed with the screw rod 12, and the valve core 11 is fixedly connected with the mounting sleeve 13. The valve seat 10 is fixed in the drill collar 2, the center of the valve seat 10 has a through hole through which the mud flows. The drill collar 2 is provided with a mounting seat 16, and the mounting sleeve 13 is inserted into the mounting seat 16 and is movable along the axial direction of the mounting seat 16. The mounting seat 16 is also used to limit the degree of freedom in the circumferential direction of the mounting sleeve 13. The mounting seat 16 is provided with a guide groove 43 arranged along the axial direction, and the outer wall of the mounting sleeve 13 is provided with a guide rail 44 arranged along its length direction. The degree of freedom in the circumferential direction of the mounting sleeve 13 is limited by the cooperation of the guide rail 44 and the guide groove 43, that is, the mounting sleeve 13 cannot rotate relative to the mounting seat 16. This is only one way of limiting the degree of freedom in the circumferential direction. It can also be realized in other ways, for example, the profile of the mounting sleeve 13 is polygonal, and the mounting seat 16 has a polygonal hole that fits with the mounting seat 13. A second angle sensor 19 is mounted at a rear end of the rotating shaft 15.

Operation principles: when the motor 9 receives the adjustment instruction from the controller 4, it starts to operate. When the rotating shaft 15 rotates, the screw rod 12 is driven to rotate, and the screw rod 12 drives the mounting sleeve 13 to move in the axial direction, thereby changing the position of the valve core 11. When the position of the valve core 11 relative to the valve seat 10 is changed, the flowable area of the through hole in the valve seat 10 is changed, thereby realizing adjustment of the opening degree. The position of the valve core 11 can be precisely controlled by providing the screw rod 12 and the second angle sensor 19. The rotation angle and the number of rotations of the rotating shaft 15 can be measured by the second angle sensor 19. Since the pitch on the screw rod 12 is fixed, the displacement of the valve core 11 is fixed when the rotating shaft 15 makes one rotation, thereby realizing the precise adjustment of the valve core 11.

Figure 4:
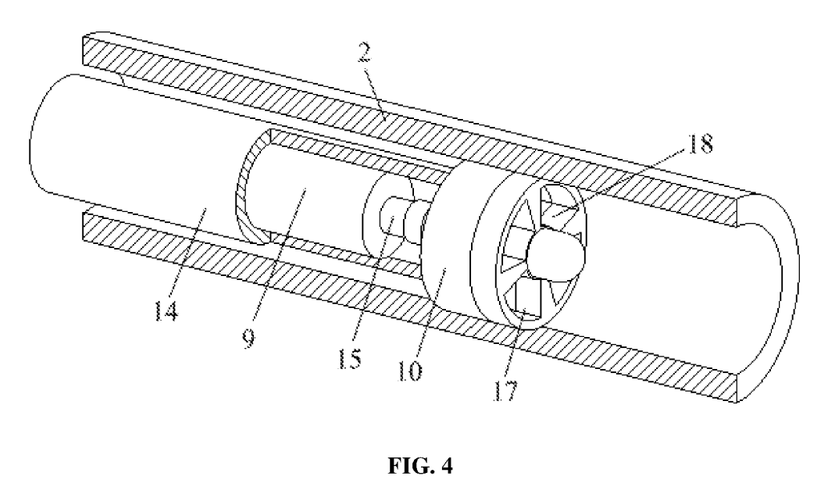
FIG. 4 is a schematic structural view showing another structure of the pressure pulse generator.

Solution 2: as shown in FIG. 4, the pressure pulse generator 1 comprises a motor 9, a valve seat 10 and an adjusting plate 17, wherein the drill collar 2 has a cylindrical motor mounting cavity 14, and the motor 9 is mounted in the motor mounting cavity 14, the motor 9 is electrically connected to the controller 4. The valve seat 10 is fixed in the drill collar 2, and the adjusting plate 17 is fixedly mounted onto a rotating shaft 15 of the motor 9, and the valve seat 10 and the adjusting plate 17 are respectively provided with a through hole 18. A second angle sensor 19 is mounted at the rear end of the rotating shaft 15 (the second angle sensor 19 is not shown in FIG. 4, and FIG. 1 of the solution 1 can be referred to).

Operation principle: after receiving the adjustment instruction from the controller 4, the motor 9 rotates the corresponding angle according to the instruction. As the rotating shaft 15 rotates, the adjusting plate 17 mounted at the end thereof also rotates. As the adjusting plate 17 rotates, the overlapping area between the through hole 18 in the adjusting plate 17 and the through hole 18 in the valve seat 10 changes, thereby realizing the adjustment of the opening degree. The solution has the advantages of precise adjustment and simple structure.

Figure 2:
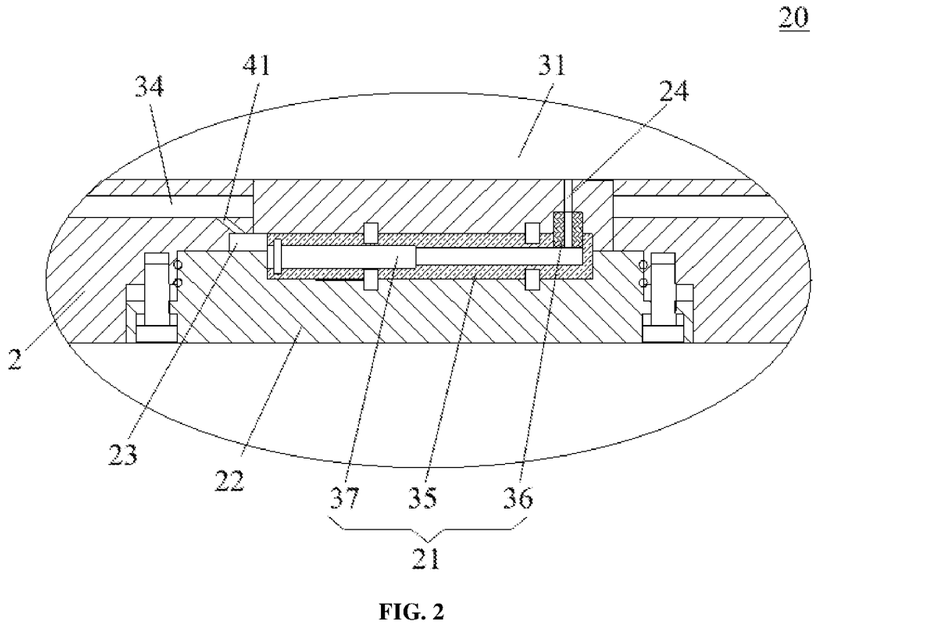
FIG. 2 is an enlarged view of a pressure measuring mechanism of FIG. 1.

In order to improve the adjustment accuracy of the present disclosure, a fine adjustment apparatus is also provided. Referring to FIGS. 1 and 2, a pressure measuring mechanism 20 is further provided. The pressure measuring mechanism 20 is provided on the outer sidewall of the drill collar 2. The pressure measuring mechanism 20 includes a sensor assembly 21 and a sealing member 22. A mounting groove 23 is formed in the outer sidewall of the drill collar 2, and the sealing member 22 is fastened to the mounting groove 23 and fixed by bolts. The sensor assembly 21 is fixedly mounted in the mounting groove 23, a liquid inlet hole 24 communicatively connected with the center flow channel 31 of the drill collar 2 is provided in the mounting groove 23, and a liquid inlet end of the sensor assembly 21 is communicatively connected with the liquid inlet hole 24. The sensor assembly 21 is electrically connected to the controller 4.

After the preliminary adjustment of the pressure pulse generator 1 is completed, it needs to be fine adjusted. If the adjustment of the pressure pulse generator 1 meets the requirements, the mud pressure in the drill collar 2 should be equal to the preset pressure value, if not, the pressure pulse generator 1 needs to be fine adjusted. The mud enters the liquid inlet hole 24 through the center flow channel 31 and flows into a pressure measuring end of the sensor assembly 21. When the sensor assembly 21 detects the current pressure value of the mud and transmits the current pressure value to the controller 4, the controller 4 determines how to further adjust the pressure pulse generator 1. It should be noted that the sensor assembly 21 can adopt either a wired sensor or a wireless sensor. To ensure the accuracy of data transmission, the embodiment preferably uses the wired sensor.

Figure 5:
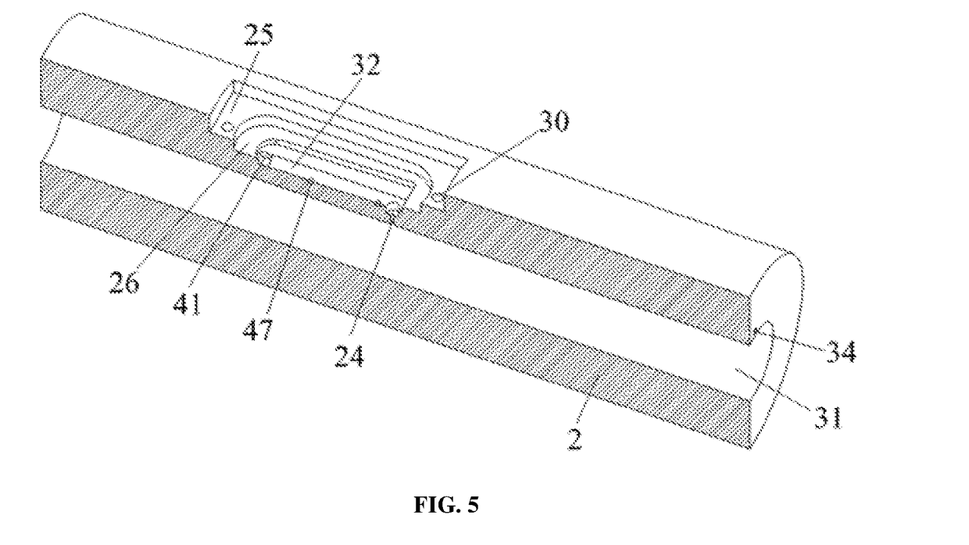
FIG. 5 is a cross-sectional view of a portion of a drill collar for mounting a pressure measuring mechanism.
Figure 6:
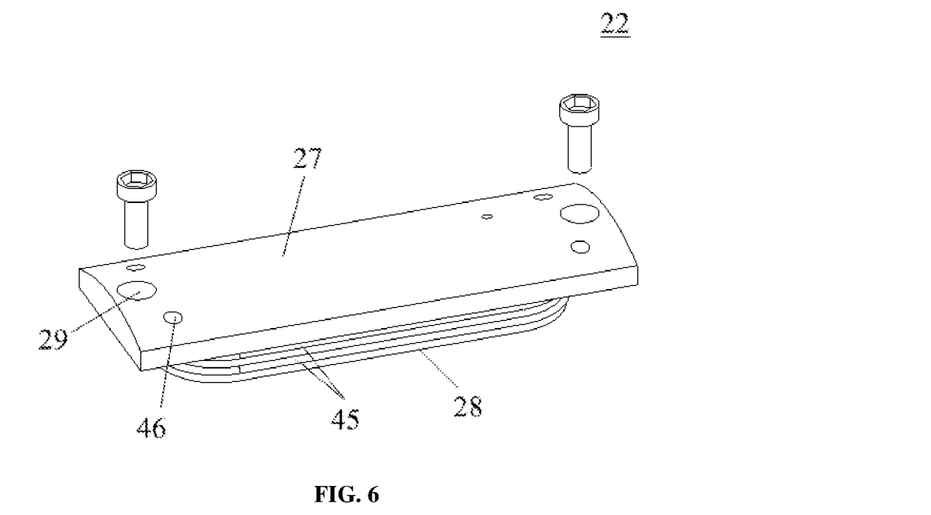
FIG. 6 is an isometric view of a sealing member.

As shown in FIGS. 5 and 6, preferably, the mounting groove 23 comprises a first groove body 25 and a second groove body 26 which are radially arranged along the drill collar 2, and the second groove body 26 is arranged on the bottom of the first groove body 25. The sealing member 22 comprises a cover portion 27 and a limiting portion 28 formed as an integrated structure, the shape and size of the cover portion 27 are correspondingly identical to the shape and size of the first groove body 25, and the shape and size of the limiting portion 28 are correspondingly identical to the shape and size of the second groove body 26. A stepped hole 29 is formed in each of the two ends of the cover portion 27, and threaded holes 30 corresponding to the stepped holes 29 are formed in the first groove body 25. A seal ring 45 is provided on the outer wall of the limiting portion 28. It should be noted that the shape of the first groove body 25 and the second groove body 26 need not be specifically limited, as long as the requirements for use can be met. In the embodiment, preferably, the first groove body 25 is a rectangular groove, and the second groove body 26 is a groove having a rectangular shape in the middle and a semicircular shape at both ends. The sealing ring 45 on the outer wall of the limiting portion 28 acts as a seal to prevent the mud outside the drill collar 2 from entering the second groove body 26. Once the mud enters the second groove body 26, the normal operation of the sensor assembly 21 is affected. The sealing ring 45 can also be arranged on the sidewall of the second groove body 26. In order to improve the sealing effect, sealing rings can be simultaneously provided on the top surface of the first groove body 25 and on the bottom surface of the cover portion 27.

In addition, the drill collar 2 is rotated at a high speed during operation, so that the top surface of the cover portion 27 preferably adopts a curved surface, that is, when the cover portion 27 is fixed, the cover portion 27 and the drill collar 2 constitute a complete cylindrical shape. Thus, during operation, the edge of the cover portion 27 is not washed by the mud, thereby protecting the sealing member 22. The use of such a structure has the problem of inconvenient disassembly. For this reason, as shown in FIG. 6, the top of the cover portion 27 is provided with at least two disassembling holes 46. In this embodiment, four disassembling holes 46 are preferably provided, the four corners of the cover portion 27 are respectively each provided with a disassembling hole 46, and the disassembling hole 46 is a blind hole. The sealing member 22 can be easily disassembled by a tool by providing the disassembling hole 46.

In order to ensure the normal operation of the sensor, it is necessary to prevent the liquid (mud) from entering the second groove body 26, so it is very important to seal the second groove body 26 well. Specifically, referring to FIG. 5 and FIG. 7, a lower holding groove 32 is arranged on the bottom of the second groove body 26, an upper holding groove 33 is arranged on the bottom of the limiting portion 28, and the upper holding groove 33 and the lower holding groove 32 are oppositely disposed. The sensor assembly 21 is mounted in a space formed by the upper holding groove 33 and the lower holding groove 32, and one end of the liquid inlet hole 24 is located in the lower holding groove 32, and the other end of the liquid inlet hole 24 is communicatively connected with the central flow channel 31. Since the present disclosure uses the wired sensor assembly 21, a wire harness hole 41 is further provided. One end of the wire harness hole 41 is located in the lower holding groove 32, and the other end of the wire harness hole 41 is in communicative connection with a wire routing hole 34 of the drill collar 2.

Figure 8:
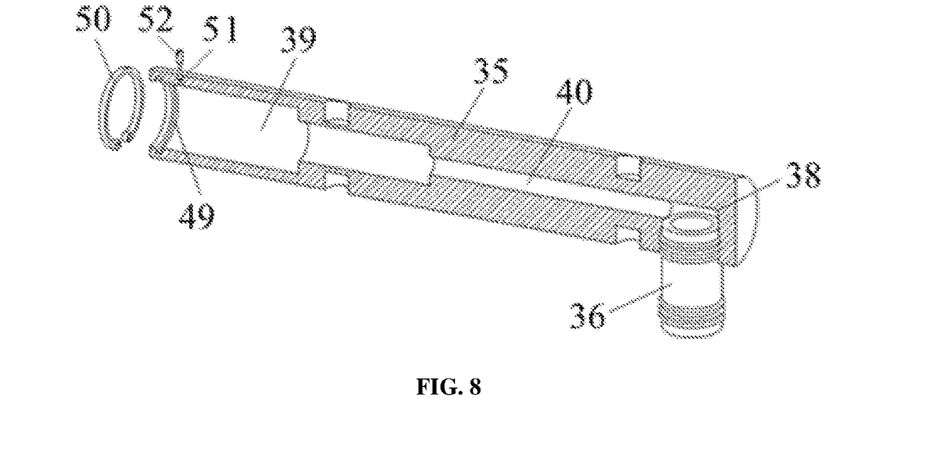
FIG. 8 is a cross-sectional view of a sensor assembly.

As shown in FIG. 2 and FIG. 8, the sensor assembly 21 comprises a sheath 35, a connector 36 and a sensor 37, wherein a first mounting hole 38 is radially formed in a sidewall of one end of the sheath 35, a second mounting hole 39 is axially formed in the other end of the sheath 35, and the first mounting hole 38 and the second mounting hole 39 are communicatively connected through a flow channel 40. One end of the connector 36 is fixedly mounted in the first mounting hole 38, and the sensor 37 is fixedly mounted in the second mounting hole 39. The sheath 35 is preferably made of an insulating waterproof material such that even if the liquid accidentally enters the second groove body 26, the sheath 35 will protect the sensor 37 from short circuit and enable the sensor 37 to operate normally. Preferably, both ends of the connector 36 are provided with sealing rings to prevent liquid leakage from the connector 36.

Since the liquid (mud) is in contact with a sensing end of the sensor 37, the sensing end of the sensor 37 and the sheath 35 should be installed in a sealed manner. To prevent the sensor 37 from swinging, preferably, the inner wall of an opening end of the second mounting hole 39 is provided with a circular groove 49 in which a limiting circlip 50 is mounted. The sensor 37 can be fixed by the limiting circlip 50. Further preferably, the outer wall of the sensor 37 is provided with a limiting hole. A through hole 51 is formed in the sheath 35. After the sensor 37 is installed in the second mounting hole 39, the limiting hole is opposite to the through hole 51. A limiting pin 52 matched with the limiting hole is mounted in the through hole 51. The sensor 37 can be further positioned by the limiting pin 52, so that axial movement of the sensor 37 is prevented.

Figure 7:
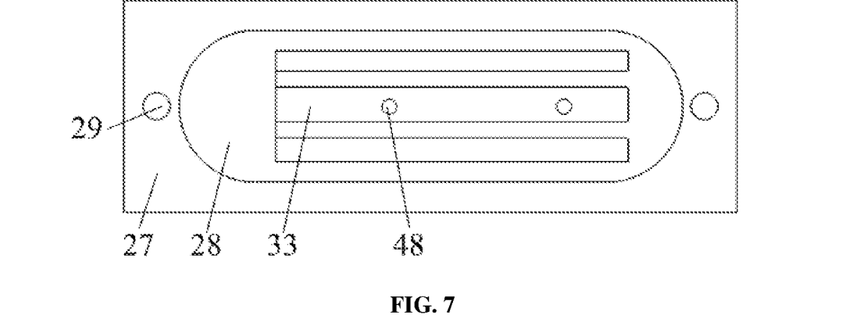
FIG. 7 is a bottom view of the sealing member.

Since sealing is critical, the mud should be prevented from leaking from a joint between the connector 36 and the liquid inlet hole 24, in addition to preventing the mud from leaking from the inside of the sensor assembly. As shown in FIG. 5 and FIG. 7, a first locating hole 48 is formed in the upper holding groove 33, and a second locating hole 47 is formed in the lower holding groove 32. A first locating pin matched with the first locating hole 48 and a second locating pin matched with the second locating hole 47 are arranged on the sensor assembly 21.

The sensor assembly 21 can be effectively positioned through the first locating hole 48, the second locating hole 47, the first locating pin and the second locating pin, thereby ensuring the sealing effect at the joint of the connector 36 and preventing leakage.

The structures, features and effects of the present disclosure are described in detail in the above embodiments with reference to the drawings, but they only show the preferred embodiments of the present disclosure, and the drawings shall not define the embodying scope of the present disclosure. The variations made according to the concept of the present disclosure, or the equivalent embodiments including equivalent modifications within the scope of the description and the drawings shall fall into the protection scope of the present disclosure.

The invention claimed is:

1. A constant amplitude adjusting method for a pressure pulse of a drilling tool, characterized by comprising following steps:
   step a, obtaining a current flow velocity value of mud at a rear of a pressure pulse generator in the drilling tool, and sending the current flow velocity value to a controller;
   step b, comparing, by the controller, the current flow velocity value with a preset flow velocity value, and sending an adjustment instruction to the pressure pulse generator according to a comparison result;
   step c, adjusting, by the pressure pulse generator, an opening degree according to the adjustment instruction from the controller.

2. The constant amplitude adjusting method for a pressure pulse of a drilling tool according to claim 1, further comprising, in the step b:
   when the current flow velocity value is equal to the preset flow velocity value, repeatedly performing step a and step b;
   when the current flow velocity value is less than the preset flow velocity value, sending the controller an instruction of increasing the opening degree to the pressure pulse generator; and when the current flow velocity value is greater than the preset flow velocity value, sending the controller an instruction of decreasing the opening degree to the pressure pulse generator.

3. The constant amplitude adjusting method for a pressure pulse of a drilling tool according to claim 2, further comprising step d, after completing the step c, obtaining a current pressure value of the mud at the rear of the pressure pulse generator in the drilling tool, and sending the current pressure value to the controller, comparing, by the controller, the current pressure value with a preset pressure value, and sending a second adjustment instruction to the pressure pulse generator according to a comparison result, adjusting, by the pressure pulse generator, the opening degree according to the second adjustment instruction of the controller again.

4. The constant amplitude adjusting method for a pressure pulse of a drilling tool according to claim 3, characterized in that, in the step d,
when the current pressure value is greater than the preset pressure value, the controller controls the pressure pulse generator to decrease the opening degree;
when the current pressure value is less than the preset pressure value, the controller controls the pressure pulse generator to increase the opening degree; and
when the current pressure value is equal to the preset pressure value, step a is performed.

5. The constant amplitude adjusting method for a pressure pulse of a drilling tool according to claim 1, further comprising step d, after completing the step c, obtaining a current pressure value of the mud at the rear of the pressure pulse generator in the drilling tool, and sending the current pressure value to the controller, comparing, by the controller, the current pressure value with a preset pressure value, and sending a second adjustment instruction to the pressure pulse generator according to a comparison result, adjusting, by the pressure pulse generator, the opening degree according to the second adjustment instruction of the controller again.

6. A constant amplitude adjusting system for a pressure pulse of a drilling tool, characterized by comprising:
a pressure pulse generator (1) that is arranged in a drill collar (2) for generating a pressure pulse wave, wherein an opening degree of the pressure pulse generator is adjustable;
a flow measuring apparatus (3) that is arranged at a rear of the pressure pulse generator (1) for measuring a current flow velocity value of mud at the rear of the pressure pulse generator (1); and
a controller (4) configured to receive the current flow velocity value measured by the flow measuring apparatus (3), compare the current flow velocity value with a preset flow velocity value, and send an opening degree adjustment instruction to the pressure pulse generator (1) according to a comparison result.

7. The constant amplitude adjusting system for a pressure pulse of a drilling tool according to claim 6, characterized in that, the flow measuring apparatus (3) comprises an impeller (5) and a first angle sensor (6), wherein the first angle sensor (6) is installed in the impeller (5).

8. The constant amplitude adjusting system for a pressure pulse of a drilling tool according to claim 7, further comprising a generator assembly (7), wherein the generator assembly (7) being electrically connected to the controller (4), and a rotor (8) of the generator assembly (7) is fixedly connected to the impeller (5).

9. The constant amplitude adjusting system for a pressure pulse of a drilling tool according to claim 6, characterized in that, the pressure pulse generator (1) comprises a motor (9), a valve seat (10), a valve core (11), a screw rod (12), and a mounting sleeve (13), wherein the drill collar (2) has a motor mounting cavity (14), the motor (9) is mounted in the motor mounting cavity (14), the screw rod (12) is fixedly mounted on a rotating shaft (15) of the motor (9), the mounting sleeve (13) is screwed with the screw rod (12), the valve core (11) is fixedly connected with the mounting sleeve (13), the valve seat (10) is fixed in the drill collar (2), the drill collar (2) is provided with a mounting seat (16), the mounting sleeve (13) is movably connected to the mounting seat (16), and the mounting seat (16) is used to limit the degree of freedom in a circumferential direction of the mounting sleeve (13).

10. The constant amplitude adjusting system for a pressure pulse of a drilling tool according to claim 9, characterized in that, a second angle sensor (19) is mounted at a rear end of the rotating shaft (15).

11. The constant amplitude adjusting system for a pressure pulse of a drilling tool according to claim 6, characterized in that, the pressure pulse generator (1) comprises a motor (9), a valve seat (10) and an adjusting plate (17), wherein the drill collar (2) has a motor mounting cavity (14), the motor (9) is mounted in the motor mounting cavity (14), the valve seat (10) is fixed in the drill collar (2), the adjusting plate (17) is fixedly mounted on a rotating shaft (15) of the motor (9), and the valve seat (10) and the adjusting plate (17) are respectively provided with through holes (18).

12. The constant amplitude adjusting system for a pressure pulse of a drilling tool according to claim 11, characterized in that, a second angle sensor (19) is mounted at a rear end of the rotating shaft (15).

13. The constant amplitude adjusting system for a pressure pulse of a drilling tool according to claim 12, characterized by further comprising a pressure measuring mechanism (20) which is provided on an outer sidewall of the drill collar (2), the pressure measuring mechanism (20) comprises a sensor assembly (21) and a sealing member (22), a mounting groove (23) is formed in the outer sidewall of the drill collar (2), the sealing member (22) is fastened to the mounting groove (23) and fixed by bolts, and the sensor assembly (21) is fixedly mounted in the mounting groove (23), a liquid inlet hole (24) communicating with a central flow channel (31) of the drill collar (2) is provided in the mounting groove (23), and a liquid inlet end of the sensor assembly (21) is communicated with the liquid inlet hole (24).

14. The constant amplitude adjusting system for a pressure pulse of a drilling tool according to claim 13, characterized in that, the sensor assembly (21) comprises a sheath (35), a connector (36) and a sensor (37), wherein a first mounting hole (38) is radially formed in a sidewall of one end of the sheath (35), a second mounting hole (39) is axially formed in other end of the sheath (35), the first mounting hole (38) and the second mounting hole (39) are communicatively connected through a flow channel (40), one end of the connector (36) is fixedly mounted in the first mounting hole (38), and the sensor (37) is fixedly mounted in the second mounting hole (39).

15. The constant amplitude adjusting system for a pressure pulse of a drilling tool according to claim 13, characterized in that, the mounting groove (23) comprises a first groove body (25) and a second groove body (26), and the second groove body (26) is arranged on a bottom of the first groove body (25), the sealing member (22) comprises a cover portion (27) and a limiting portion (28) which are of an integrated structure, a shape and a size of the cover portion (27) are correspondingly identical to a shape and a size of the first groove body (25), and a shape and a size of the limiting portion (28) are correspondingly identical to a shape and a size of the second groove body (26), a stepped hole (29) is formed in each of two ends of the cover portion (27), and threaded holes (30) corresponding to the stepped holes (29) are formed in the first groove body (25).

16. The constant amplitude adjusting system for a pressure pulse of a drilling tool according to claim 15, characterized in that, a lower holding groove (32) is arranged on a bottom of the second groove body (26), an upper holding groove (33) is arranged on a bottom of the limiting portion (28), the upper holding groove (33) and the lower holding groove (32) are oppositely disposed, the sensor assembly (21) is mounted in a space formed by the upper holding groove (33) and the lower holding groove (32), and one end of the liquid inlet hole (24) is located in the lower holding groove (32), and other end of the liquid inlet hole (24) is communicatively connected with the central flow channel (31).

17. The constant amplitude adjusting system for a pressure pulse of a drilling tool according to claim 16, characterized by further comprising a wire harness hole (41), one end of the wire harness hole (41) is located in the lower holding groove (32), and other end of the wire harness hole is communicatively connected with a wire routing hole (34) of the drill collar (2).

\* \* \* \* \*